US008008878B2

(12) United States Patent
Götz et al.

(10) Patent No.: US 8,008,878 B2
(45) Date of Patent: Aug. 30, 2011

(54) SYSTEM FOR SEAMLESS ESTIMATION OF SPEED AND/OR POSITION, INCLUDING STANDSTILL OF A PERMANENT MAGNET ROTOR OF AN ELECTRIC MOTOR

(75) Inventors: Fritz Rainer Götz, Oberasbach (DE); Viktor Barinberg, Nürnberg (DE)

(73) Assignee: Baumuller Nurnberg Gmb, Nuremberg (DE)

( * ) Notice: Subject to any disclaimer, the term of this patent is extended or adjusted under 35 U.S.C. 154(b) by 539 days.

(21) Appl. No.: 12/185,868

(22) Filed: Aug. 5, 2008

(65) Prior Publication Data
US 2009/0039810 A1 Feb. 12, 2009

(30) Foreign Application Priority Data

Aug. 6, 2007 (EP) ..................................... 07113873

(51) Int. Cl.
*H02P 21/00* (2006.01)
(52) U.S. Cl. .......... 318/400.02; 318/400.14; 318/400.32
(58) Field of Classification Search ............. 318/400.01, 318/400.02, 400.14, 560, 721, 727, 779, 318/799, 800, 801, 400.15, 400.32, 400.35
See application file for complete search history.

(56) References Cited

U.S. PATENT DOCUMENTS

| 6,163,127 | A | * | 12/2000 | Patel et al. | 318/700 |
| 6,763,622 | B2 | * | 7/2004 | Schulz et al. | 318/700 |
| 6,809,496 | B2 | * | 10/2004 | Anghel et al. | 318/700 |
| 6,831,439 | B2 | * | 12/2004 | Won et al. | 318/701 |
| 6,894,454 | B2 | * | 5/2005 | Patel et al. | 318/700 |
| 7,026,772 | B2 | * | 4/2006 | Quirion | 318/400.02 |
| 7,577,545 | B2 | * | 8/2009 | Hu | 702/151 |
| 7,759,897 | B2 | * | 7/2010 | Piippo | 318/700 |
| 2004/0189240 | A1 | | 9/2004 | Islam et al. | |
| 2005/0151502 | A1 | * | 7/2005 | Quirion | 318/715 |

FOREIGN PATENT DOCUMENTS
WO  WO2005/099082 A1  10/2005
* cited by examiner

*Primary Examiner* — Walter Benson
*Assistant Examiner* — Antony M Paul
(74) *Attorney, Agent, or Firm* — Frank H. Foster; Kremblas & Foster

(57) ABSTRACT

Procedure for determining the electrical drive speed ($\omega_{ef}$) and/or position ($\phi_e$) in a permanent magnet rotor of a brushless electrical linear or rotary motor from a measurement of a multi-phase stator current ($i_1, i_2$). Speed is determined using a mathematical motor model (9). From the influence of a rotor reverse EMK that affects the stator current ($i_1, i_2$) conclusions are made about the rotor speed ($\omega_{ef}$) and/or position ($\phi_e$) and an appropriate model speed value (13,19,23) is generated.

19 Claims, 2 Drawing Sheets

Figure 1A:
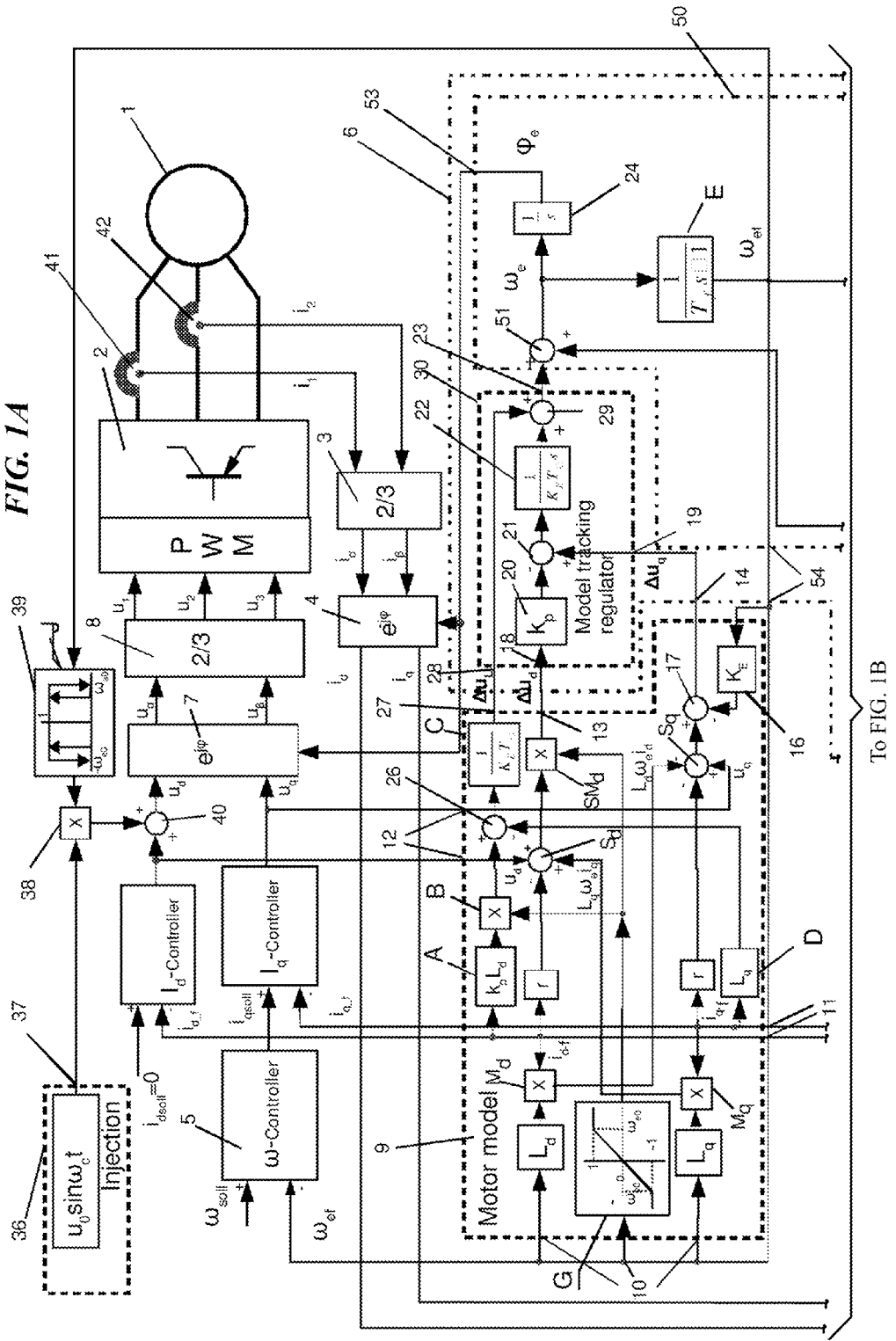
Figure 1B:
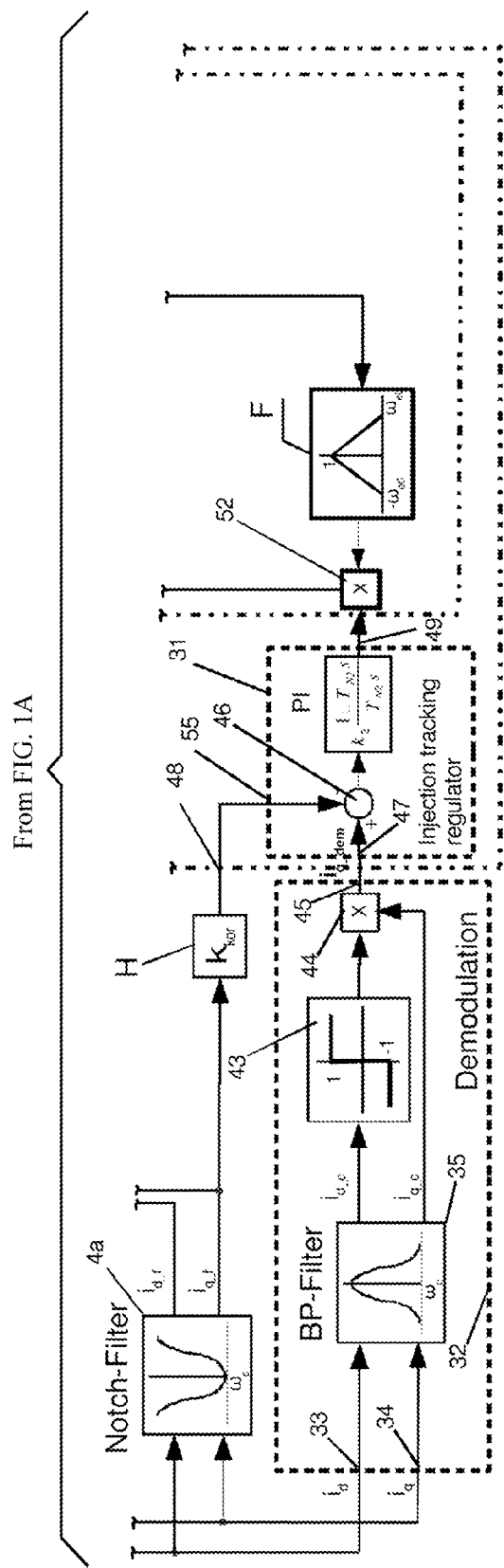

To FIG. 1B

SYSTEM FOR SEAMLESS ESTIMATION OF SPEED AND/OR POSITION, INCLUDING STANDSTILL OF A PERMANENT MAGNET ROTOR OF AN ELECTRIC MOTOR

The invention relates to a procedure for estimating the (electrical) drive speed and/or position in a permanent magnet rotor of a brushless electric motor. It is especially suited for use in a drive control circuit. For the procedure, multi-phase current measurements are used on the motor, from which a speed is seamlessly estimated over the entire speed range, including standstill of the rotor. For the higher speed range, a mathematical motor model is used in which from the influence of a rotor back-EMF (electromotive force) that affects the stator current conclusions are made about the rotor speed and position and an appropriate model speed value (and also position value if necessary) are generated. For the lower speed range, including standstill of the rotor, a (for example voltage) injection procedure is used, in which current-bearing stator winding are connected with a test signal source (for example with a certain carrier frequency). The resulting stator currents are evaluated and/or filtered for position-sensitive anisotropies in the magnetic structure of the electric motor, whereby conclusions can be made on the rotor speed and/or position and an appropriate injection speed can be generated. In a combination element the model and injection speed values are fused while supplementing each other for the drive speed to be estimated, whereby correspondingly as the estimated drive speed increases, the influence or the contributions of the injection speed values relative to those of the model speed values are lessened. Additionally the invention relates to position and/or speed estimators appropriate to carry out this procedure, fusion models and motor modeling modules according to the respective first parts or preambles of the subordinate independent claims 7, 13 and 19.

For estimation of the position and speed of the permanent magnet rotor in a brushless electrical drive motor, in the Austrian specialized journal "Elektrotechnik und Informationstechnik," no. 2 for 2000, the article "Controlled Drives" on pages 103-112, by M. Schrödl and E. Robeischl, provides information about an EMF or voltage model of the permanent magnet synchronous motor, capable of real-time estimation of position and speed information necessary for example for a drive control, from electrical quantities at higher speed, in the area above about 10% to 20% of nominal speed. The rotor position is estimated based on the voltage induced in the stator winding, which does not influence current control. The basic idea of that is to use measurement technique to evaluate the change in the stator flux linkage space vector. By measurement of the current signals, the change in the permanent magnet flux linkage of the permanent magnet rotor is detected. A system for estimating the drive position and/or speed in a brushless electric motor, especially a synchronous motor, with a permanent magnet rotor, of about the same type named in the first paragraph, is known from S. M. Abu-Sharkh's and V. Barinberg's article "A new approach to rotor position estimation for a PM brushless motor drive", Mediterranean Electrotechnical Conference 1998, pages 1199-1203. According to it, the rotor position and/or speed are likewise identified using the EMF-voltage model of the electric motor.

However, as per the explanations from the cited work in the Austrian specialized journal, the back-EMF of the rotor is detected and evaluated only for the above-named higher speed range, where the voltage or rotor back-EMF is still sufficiently high. Therefore, for the lower speed range, below about 10-20% of the nominal speed, a suggestion is made in the above-named citation from the Austrian specialized journal to exploit fluctuating magnetic conductivity in dependence on the rotor setting as a result of magnetic saturation primarily of the teeth, but also of the yoke of the motor stator, resulting from high local flux densities as well simultaneously, or alternatively, reluctance effects through geometrically caused axialities. U.S. Pat. No. 7,180,262 B2 by A. Consoli goes mainly in the same direction with a suggestion to detect and evaluate the natural or induced anisotropies in the magnetic structure of an electric motor with field-oriented vector control. A suggestion is made in "Encoderless control of industrial servo drives", by O. C. Ferreira and R. Kennel, from the 12th International Power Electronics and Motion Control Conference, August 2006, pages 1962-1967 in FIG. 4, for a control structure for detecting and evaluating magnetic anisotropies at a low speed range for assessing the position and/or speed of the permanent magnet rotor. According to that work, a high-frequency test signal of a certain carrier frequency is to be injected or overlaid onto the stator currents, and the rotor position is to be determined by means of a demodulator with a bandpass and a tracking regulator.

Generally the technical world is aware that techniques to detect rotor speed and position based on magnetic anisotropies with injection of high-frequency test signals into the stator currents are not appropriate and not desirable for higher speed ranges, for which see "Sensorless Control of IPMSM Seamlessly Covering Entire Speed Range without Rotor Position Sensor" by Roman Filka and Peter Balazovic in Power Electronics Intelligent Motion, Power Quality. Proceedings of the International Conference (PCIM 2006), May 30 to Jun. 1, 2006, Nürnberg; and U.S. Pat. No. 7,026,772 B2 by J. Quirion, for example. Therefore, Roman Filka et al suggest combining the two techniques—use of a motor-voltage model via the induced rotor back-EMF to detect rotor position and speed, and HF injection of test signals into the stator currents and detection of magnetic anisotropies, for seamless covering of the entire speed range, for which see FIG. 3 and others in the cited work by R. Filka. According to it, as per FIG. 3 there a "Cross over merging algorithm" block is linked on the input side both with a "Saliency tracking observer" for magnetic anisotropies and with a "state filter observer" for the rotor back-EMF. On the output side, values generated for the rotor position and speed are outputted.

In the citation named above by M. Schrödl et al from the Austrian specialized journal, in FIG. 6 there, a more detailed depiction is provided of the combination of the rotor position measurement on the one hand from the rotor back-EMF via a corresponding EMF model, and on the other hand using motor inductance parameters in connection with magnetic anisotropies. The speed and position values obtained from the two assessment procedures are linked with each other in additive fashion, and applied to a state model.

A procedure and system of about the same type as that named in the first paragraph is described in U.S. Pat. No. 7,026,772 B2 by Jean Quirion. According to it, the detection results from a voltage-motor model for the rotor back-EMF are to be combined or "fused" with the detection results of a high-frequency injection process for anisotropies in the magnetic structure of the electric motor. The fusion algorithm is specified to that effect (see FIGS. 6 and 8 therein), so that data from the determination procedure, both with the motor model and also with the injection procedure, are seamlessly subtracted from each other over the entire speed range in a summating element to form an error or deviation signal. The deviation is stabilized via a subsequent PI-controller and back coupling of only one position value obtained per integration, roughly as per the type of a PLL circuit. For increasing speeds it is suggested that injection of the HF signal be suppressed. By this means, among other things, audible noise is suppressed. In connection with the suppression of the HF injection at increasing speeds, a description is given of the action of the fusion algorithm operating more on the basis of the rotor back-EMF and less on the basis of the HF injection procedure. In addition, a suggestion is given to "dim down" the HF injection excitation at the stator current.

The task that is the basis for the invention is to more effectively repress the influence of speed values that are gained via injection of a test signal into the stator current and evaluation of magnetic anisotropies with increasing motor speed. To solve it, we refer to the estimation procedure indicated in claim 1, the estimator indicated in claim 7, the fusion model indicated in claim 13 and the machine modeling module indicated in claim 19. Optional advantageous further embodiments of the invention are gleaned from the dependent claims.

While according to the invention, the speed values, before they can be fused in the combination element with the model speed values, are linked with a weighting function that preferably produces weighting factors that decrease in terms of absolute value with increasing speed, the output values in the higher speed range can be repressed and suppressed, regardless of whether the test signal source connected on the stator conduit is still active or suppressed. Thus, the injection process is reliably suppressed at higher speeds, where the injection process is accompanied by numerous disadvantages described in the specialty.

Another advantage attainable with the invention is that in the low speed range, the model and injection speed values can be supplemented in stabilizing fashion on the one hand from the motor model and on the other hand from the injection procedure. With weighting increasing up to 100%, the injection speed values can be inserted into the fusion, whereby, parallel to that, the model speed values enter into the estimation of the drive speed. At the low speed range, the injection process delivers good signals, which so additionally supplement the output of the motor model, especially since the signals from the motor model deteriorate as speed values drop off. Nevertheless, in the lower speed range also, the speed values from the motor model continue to contribute toward overall computation of the drive speed and position if needed, though to a reduced degree.

For generation of the weighting factors for the weakening of the injection speed values, according to an advantageous embodiment of the invention, an absolute value formation function is used. In an additional, optional embodiment of this concept, the curve of the absolute value formation function declines with increasing amounts of the argument (here: speed). It is appropriate for the decline to be linear.

According to a further embodiment of the invention, the weighting or absolute value formation function is so configured that starting with a pre-set limit speed, the weighting factors only amount to zero or the contributions of the injection speed values to the overall computation are fully suppressed. Appropriately the selected limit speed is in the range from 3 to 10% of the nominal speed for rotary motors. Such a limit speed or r.p.m. can also be used as a signal for switching off the test signal source from the stator winding. Thus is security enhanced against such disturbances, which would be generated in exacerbated fashion with increasing drive speed and with the stator test signal injection switched on. In addition, ohmic heat losses due to the injection current are avoided.

According to an optional embodiment of the invention, the fusion-combination element is appropriately implemented as a summating or addition element. With addition, in an especially simple fashion, the model and injection speed values attain complementary interaction. At low speeds, where the rotor back-EMF has become too weak per se, via the model speed values they can still contribute to stabilizing the injection speed values, which, with the low speed range, form the main basis for estimating speed.

For suppression of high-frequency disturbance shares, a further advantageous embodiment of the invention consists in subjecting the output of the combination element for estimated drive speed values to a filtration with $PT_1$- or low pass characteristics. 100 Hz or a time constant between one and two milliseconds have in practice proven themselves as an appropriate cutoff frequency.

It is within the limits of the invention that direct and quadrature components of current and of a voltage demand are input to the mathematical motor model as input variables, which previously are respectively transformed into a rotor-related d,q reference frame. Similarly, as part of the injection procedure, direct and quadrature components of the stator current can be input to the pertinent demodulator with bandpass filter as input variables, which also previously are transformed into a rotor-related d,q reference frame.

While with the invention-specific fusion module, provision is made for two voltage and injection tracking controllers, independent of each other and operating in parallel, assigned on the one hand to the mathematical motor model and on the other hand to the injection procedure, at low speeds the model speed values can provide stabilizing support to the injection speed values in a combination element, although due to the weak rotor back-EMF they would not per se solely be suitable for providing drive speed values. A path is opened toward improvement of speed estimation in the low speed range, attainable based on the two model and injection tracking controllers operating parallel for the motor model and the injection procedure. In a further optional embodiment, the two tracking controllers are coupled via their respective outputs in the combination element, corresponding to claim 14, feature c.

Further particulars, features, combinations of features, advantages and effects based on the invention can be gleaned from the following specification of a preferred embodiment example of the invention as well as from the drawing. The sole FIGURE shows FIG. 1 a schematic depiction of a "sensorless" drive controller with an invention-specific position and speed estimation system in the form of a block diagram.

As per FIG. 1, the stator 1 of a brushless electric motor, for example a synchronous motor with a permanent magnet rotor which is not shown, is supplied by a power converter 2 operating on the basis of pulse width modulation (PWM) with three-phase alternating current. For current regulation, via current sensors 41, 42 the two phase currents $i_1$, $i_2$ are accessed or measured from stator 1, which is modeled in a 3-to-2 phase transformation unit 3 to a stator-related, α, β-reference frame. In the course of the transformation, two vector components $i_\alpha$, $i_\beta$ representing the stator current α, β are generated, and outputted to a second, coordinate transformation unit 4 placed after. This is configured to perform a coordinate transformation from the stator-related α,β reference frame to a rotor-related d,q reference frame with the output of the current direct and quadrature vector components $i_d$, $i_q$. These current vector components are passed to a notch filter 4a with a center frequency that corresponds to an injected carrier angular frequency $\omega_c$ for which see the explanations below. It serves to filter out the high frequency components appearing through the injection from the current direct and quadrature components $i_d$, $i_q$. The "no longer soiled" current vector components $i_{d\_f}$, $i_{q\_f}$ at the notch filter output from the stator current are forwarded as feedback values to the direct current and quadrature current regulators $I_d$, $I_q$ for a command value-feedback value comparison with corresponding direct and quadrature command values $i_{dsoll}$, $i_{qsoll}$. As is customary per se in the specialty, the direct current preset command value $i_{dsoll}$ is set to zero, while the quadrature current regulator receives the command value $I_{qsoll}$ from a speed regulator 5 placed before. This proceeds from a comparison of a speed command value $\omega_{soll}$ with the estimation value outputted from a fusion module 6 for an electrical, low-pass-filtered (see Block E) speed $\omega_{ef}$. Additionally, from the fusion module 6, an estimated electrical angle $\phi_e$ is outputted and forwarded to the second transformation unit 4 as well as to a third transformation unit 7 complementary to this one. The third transformation unit 7 further receives the direct and quadrature voltage vector components $u_d$, $u_q$ preset by the current regulators $I_d$, $I_q$ and reproduces these into the stator-related $\alpha$, $\beta$ reference frame with the voltage demand vector components $u_\alpha$, $u_\beta$. The latter voltage vector components are received by a 2-to-3 phase transformation unit 8 placed after, which converts the voltage demand into three phases $u_1$, $u_2$, $u_3$ corresponding to the alternating current system for the power converter 2 placed after.

According to FIG. 1, a motor modeling module 9 is placed ahead of fusion module 6. This has input interfaces 10 for the estimated, filtered speed $\omega_{ef}$, input interfaces 11 for the direct and quadrature currents $i_{d\_f}$, $i_{q\_f}$ measured, mapped into the d,q reference frame and notch-filtered, and input interfaces 12 for the direct and quadrature voltage demands $u_d$, $u_q$ in the d,q reference frame. Additionally, the modeling module 9 has a first output interface 13 for the direct voltage deviation $\Delta u_d$ and a second output interface 14 for the quadrature voltage deviation $\Delta u_q$.

According to FIG. 1, the estimated, filtered speed $\omega_{ef}$ that is forwarded via the speed input interfaces 10 to the motor model 9 is weighted with multiple separate proportional elements, whose amplifications correspond to the EMF constant $K_E$, the motor direct inductance $L_d$ and the motor quadrature inductance $L_q$. Additionally, the input speed $\omega_{ef}$ is weighted with a limiting element G. This has a sign function for motor speeds that lie outside an interval or window for the smaller speed range from $-\omega_{e0}$ to $+\omega_{e0}$ that is assigned to the injection procedure, thus to the larger speed range assigned to the motor model. If the motor speed or r.p.m. become very small, then the section with the preferably constant slope in the limiting element G provides that an unstable switching back and forth between a positive and negative sign is avoided. The limiting element G thus contributes, in the area of the lower speed assigned to the injection procedure, to providing continuing stabilizing contributions from the motor model to the overall speed estimation.

The outputs of the inductance proportional elements $L_d$, $L_q$ are each connected with a separately assigned multiplier element $M_d$, $M_q$. The second inputs of the multiplier elements $M_d$, $M_q$ are each linked with the corresponding two current input interfaces 11 for notch-filtered direct or quadrature current $i_{d\_f}$, $i_{q\_f}$. The respective outputs of the multiplier elements $M_d$, $M_q$ are forwarded to direct voltage or quadrature voltage summating elements $S_d$, $S_q$ respectively with a negative ($M_d$) and positive sign ($M_q$). To one second input of the direct or quadrature voltage summating elements $S_d$, $S_q$, via the voltage input interfaces 12, the direct or quadrature voltage demands $u_d$, $u_q$ are forwarded, each with a positive sign. The two voltage summating elements $S_d$, $S_q$ each possess an additional negative input, each with a negative sign, to which a respective output of the two proportional elements placed ahead with the amplification r corresponding to the ohmic motor resistance is forwarded. As already mentioned above, the two ohmic proportional elements r weight the current vector components $i_{d\_f}$, $i_{q\_f}$ that have passed through the notch filter 4a with the ohmic motor resistance.

According to FIG. 1, the limiting element G is connected on the input side with the speed input interface 10 and on the output side with the first input of a sign multiplier element $SM_d$. Its second input communicates with the output of the direct voltage summating element $S_d$, and the output of the sign multiplier element $SM_d$ is in connection with the first output interface 13 for the direct vector component $\Delta u_d$ of voltage deviation. By this means, the direction of the electric motor's rotor can be included into the computation of the position estimation error.

According to FIG. 1, with the computation of the speed estimation error in the form of the quadrature vector component $\Delta u_q$ of the voltage deviation, the EMF motor constant has an influence via a proportional element 16 that is dimensioned with corresponding amplification. For this, on the input side, the EMF proportional element is linked with the speed input interface 10. On the output side, the EMF proportional member 16 is linked with the minus input of an EMF summating element, whose plus input communicates with the output of the quadrature voltage summating element $S_q$. The output of the EMF summating element 17 goes directly to the second or quadrature voltage deviation output interface 14 of the modeling module 9 for outputting the speed estimation error to the fusion module 6 placed after.

According to FIG. 1, the motor model 9 additionally comprises inductance proportional elements A, D with direct or quadrature inductance $L_d$, $L_q$ as the respective amplification factor. As the drawing indicates, to the inductance proportional element A in series connection, an additional proportional element can be placed before or after, that corresponds to an identical or similarly dimensioned proportional element 20, that is integrated into the model tracking regulator (see below) that is assigned to motor model 9, and there can be interpreted as a "position regulation element." To the output of the inductance proportional element A responsible for the direct vector component $i_{d\_f}$ of the notch-filtered stator current, a multiplier element B is placed after, whose second input is connected with the output of the already named limiting element G that essentially fulfils the sign function, through which the direction of rotor turning or rotor linear motion is included. The output of the multiplier element B is placed on the plus input of and inductance summating element 26, whose second input, provided with a negative sign, is connected with the output of the inductance proportional element D that is responsible for the filtered current vector quadrature component $i_{q\_f}$ with the motor quadrature inductance $L_q$ as proportional amplification. The difference value resulting at the output of the inductance summating element 26 is weighted with a proportional element C that is assigned or placed after, that is dimensioned according to the motor-specific EMF (electrical motor force) constant $K_E$ and the time constant $T_\omega$, and is connected on the output side with the third output interface 27 for an inductance voltage deviation $\Delta u_L$.

According to FIG. 1, the fusion model 6 placed after the motor model 9 comprises two tracking regulators that operate simultaneously and independent of each other, namely a first model tracking regulator 30 and a second injection tracking regulator 31. Model tracking regulator 30 is assigned to the motor model 9, and the injection tracking regulator 31 is assigned to a demodulation module 32 that is described below.

According to FIG. 1, the model tracking regulator 30 has two input interfaces 18, 19 for the direct and quadrature vector components $\Delta u_d$, $\Delta u_q$ of the voltage deviation computed in modeling module 9. The direct vector component corresponds to the position estimation error, and the quadrature vector component to the speed estimation error. The input interface 18 for the direct voltage deviation $\Delta u_d$ is forwarded directly to the proportional element 20, which is dimensioned with the proportional amplification kp and is connected on the output side with the minus input of a first tracking summating element 21. Its plus input is connected internally directly in the voltage tracking regulator 30 with the input interface for the quadrature voltage deviation $\Delta u_q$. The summation result is forward on the output side to a first integration element 22, that is embodied according to the invention with no proportional part, and is determined on the basis of the EMF constant $K_E$ and a time constant $T_\omega$. The output of the integration element 22, which performs an integration of the difference of the direct and quadrature voltage deviation over time, is forwarded to the plus input of a second tracking summating element 29. This second plus input is connected internally in the model tracking regulator 30 with its third input interface 28. The latter is placed onto the third output interface 27 of modeling module 9 or on the output of proportional element C. Thus, the value outputted at output interface 27 of modeling module 9 for the inductance voltage deviation $\Delta u_L$ (which replaces the internal differentiation of current in the motor model that is required as such from motor physics) is inputted to the third input interface 28 of the model tracking regulator 30. Internally, the voltage deviation $\Delta u_L$ in model tracking regulator 30 is forwarded to the second plus input of the second tracking regulator 29. To the other plus input of the second tracking summating element, the output of the first integration element 22, likewise with a positive sign, is assigned. The output of the second tracking summating element leads to an output interface 23 of model tracking regulator 30.

According to FIG. 1, input interfaces 33, 34 of the demodulation module 32 adjoin parallel to notch filter 4a, likewise at the outputs for rotor-related vector components $i_d$, $i_q$ of the second coordinate transformation unit 4. The input interfaces 33, 34 lead to a bandpass filter 35, whose center frequency corresponds to a carrier angular frequency $\omega_c$. On the basis of this carrier angular frequency $\omega_c$ an injection signal source 36 operates or oscillates via whose output 37 a test signal with the amplitude $u_0$ (for example, 100 volts with a carrier frequency of 1 kHz) is injected in stator currents $i_1$, $i_2$. The injection is done via the input of a multiplier element 38, whose second multiplier input is linked with a hysteresis switching element 39. This is controlled with sensitivity to the estimated filtered speed $\omega_{ef}$. If the amount of the estimated speed $\omega_{ef}$ lies in a window formed between the two limit frequencies $\pm\omega_{e0}$, the switching element issues the value one to the multiplier element 38, and the injection signal source 36 is switched through with its output 37 to a regulator output summating element 40. This is connected on the output side with the direct voltage input of the third coordinate transformation unit 7, so that via the two transformation units 7, 8 an appropriate, higher-frequency test signal, that contains the carrier angular frequency $\omega_c$, is coupled via power converter 2 into the current circuit of stator 1, and from there, via the two current sensors 41, 42, can be accessed again from the first transformation unit 3. If the filtered, estimated drive speed $\omega_{ef}$ lies outside the named speed window $-\omega_{e0},+\omega_{e0}$, an interruption is made of the connection of the injection output 37 to the regulator summating block 40 owing to a zero output of the switching element, which is appropriate at higher drive speeds to avoid disturbances based on the high-frequency carrier angular frequency $\omega_c$.

Since the carrier angular frequency $\omega_c$ of the injection signal source 36 is known, with the demodulation module 32, the bandpass filter 35 with its pass range can be adjusted to this carrier angular frequency $\omega_c$. As a result of this, at the output of bandpass filter 35, current vector components $i_{d\_c}$, $i_{q\_c}$ are available, that contain as frequency shares in essence only the carrier angular frequency $\omega_c$ corresponding to the test signal stored via the regulator output summating point 40. The current vector quadrature component $i_{qc}$ filtered out by the bandpass filter corresponds to a correction signal sensitive to the magnetic anisotropy, wherein information is contained about the rotor position. For further particulars and theoretical background, we refer to the citation already given above of O. C. Ferreira and R. Kennel "Encoderless control of . . . ", especially FIGS. 3 and 4 there with the pertinent description. According to that, it is advantageous to inject or overlay an alternating test signal with the high carrier angular frequency $\omega_c$ only of the voltage vector direct component $u_d$ from the corresponding regulator output, to avoid disadvantageous influences on the current-voltage vector quadrature components $i_q$, $u_q$, relevant for generation of torque moments. After filtering out the carrier frequency current quadrature component $i_{qc}$ in demodulator 32, these are rectified regarding the carrier frequency current direct component $i_{d\_c}$ which occurs by means of a sign element 43 and a multiplier element 44. For this, the direct component $i_{d\_c}$ of the carrier current vector is forwarded from bandpass filter 35 to the input of the sign element 43. Its output is connected with a multiplier input. The other multiplier input of multiplier element 44 is connected with the bandpass output for the quadrature component of the carrier current. The output of the multiplier element simultaneously forms the output interface 45 of demodulator 42 for the demodulated high frequency shares $i_{q\_dem}$ of the quadrature current $i_q$.

In the citation named at the outset, Ferreira and Kennel, on page 1966 linked with FIG. 6, note that with increasing mechanical load, the stator's base current increases. By this means, the orientation of the anisotropy, as it is detected by injection tracking regulator 31, is shifted, resulting in an angular error that is caused by a displacement of the saturation maximum through the stator current vector quadrature component, which is relevant for the generation of the torque. However, such an erroneous displacement can be compensated by a simple linear adaptation of the loading current generating the torque. For that, the proportional element $k_{kor}$ (block H) serves, designated in FIG. 1 with an error correction function. The correction proportional element H is fed on the input side by a stator quadrature current $_{q\_f}$ purified by the notch filter of shares of the carrier circuit frequency $\omega_c$ and at the output of the proportional element H a current-sensitive compensation signal is available. Now the effect of a load-sensitive error can be compensated, in that the current-sensitive compensation signal from the proportional element H is forwarded to a minus input of an input summating element 46, whose plus input is connected with the output interface 45 of demodulator 32.

For the injection tracking regulator 31, the input summating block 46 forms the first input station or the current value input interface 47 for the demodulated quadrature current $i_{q\_dem}$, and 48 designates the input interface for the current-sensitive compensation signal. The summating result is brought on the output side to a proportional integral regulator PI. Its output forms the output interface 49 of the injection tracking regulator 31.

According to FIG. 1, the fusion module 6 also comprises a combination device 50, which has input interfaces for the output interfaces 23, 49 of the two tracking regulators 30, 31. The output interface 23 of the model tracking regulator 30 is delivered directly to a plus input of a fusion summating block 51. The output 49 of the injection tracking regulator 31 is coupled with the second plus input of the fusion summating site 51 indirectly via a weighting multiplier 52. The multiplier input of the weighting multiplier 52 is connected with the output of an absolute value formation element F. According to the designated embodiment example, this has a speed-sensitive roof-shaped characteristic curve composed of two slanting sections, which drop, and each show a falling or negative slope when the speed increases in terms of amount. The two sections that preferably are symmetrical to each other meet at the weighting value "1," at the zero speed in a corner. Additionally, the characteristic line of the absolute value formation element F has two zero points, that correspond to the two named limiting speeds $\pm\omega_{e0}$. If the amount of the estimated, filtered speed $\omega_{ef}$ at the input of the absolute value formation element F lies outside the speed interval extending from $-\omega_{e0}$ to $+\omega_{e0}$ the output 49 of the injection tracking regulator 31 is weighted at "zero" or masked. Otherwise, the injection tracking regulator output 49 is weighted more strongly, the more the determined speed amounts $|\omega_{ef}|$ approach zero, or the smaller the drive speed amount becomes. The velocity-sensitive characteristic line of the absolute value formation element F that drops bidirectionally from a speed value of zero provides for this. Its input is fed from the output of the fusion summating site 51, preferably indirectly via a low-pass filter placed between, or a $PT_1$-element E, via which, from the determined drive speed $\omega_e$ at the output of the fusion summating site 51 a filtered, estimated drive speed $\omega_{ef}$ is generated. While with drive speed amounts greater than the limit speed amount $\pm\omega_{e0}$ the injection tracking regulator 31 at its output is masked through appropriate weighting, at low speeds within the named window or interval from $-\omega_{e0}$ to $+\omega_{e0}$ the model tracking regulator 30 basically remains active or switches through with its output 23 to the fusion summating site 51. By this means, even at low speeds, where the rotor back-EMF is too weak by itself to evaluate and estimate the rotor position, the model tracking regulator continues to provide contributions that stabilize and supplement values from the injection tracking regulator 31 that are relevant at low speeds. Thus the precision is increased for speed values within the named speed interval of $-\omega_{e0}$ to $+\omega_{e0}$.

Additionally, internally in the combination device 50 the estimated drive speed or r.p.m. available at the output of the fusion summating site 51 is forwarded to a second integration element 24, which computes therefrom, in a manner known per se, the electrical drive position or angular position $\phi_e$ via integration over time, and issues it via a position output interface 53 to the second and third coordinate transformation units 4, 7, through which the transformation is controlled between the stator- and rotor-related reference frames. The filtered drive speed $\omega_{ef}$ estimated according to the low-pass or $PT_1$-element is available at output 54 of the combination device 50 or of the fusion module 6 for further feedback coupling to the modeling module 9 (speed input interface 10) as well as to the speed regulator 5.

List of reference symbols

| | |
|---|---|
| 1 | Stator |
| 2 | Power converter |
| 3 | 3-to-2 u-2 Phase transformation unit |
| 4 | second coordinate transformation unit |
| 4a | notch filter |
| $\alpha, i_\beta$ | vector-current components in stator-related $\alpha, \beta$ reference frame |
| $i_d, i_q$ | vector-current components in rotor-related d, q reference frame |
| $i_{dsoll}, i_{qsoll}$ | command value for direct and quadrature current |
| $i_d, I_q$ | direct and quadrature current regulator |
| 5 | speed regulator |
| 6 | Fusion module |
| $\omega_{soll}$ | speed command value |
| E | Low pass |
| $\omega_{ef}$ | estimated, filtered speed |
| $\phi_e$ | estimated electrical angular position |
| 7 | third coordinate transformation unit |
| $u_d, u_q$ | direct and quadrature voltage presets |
| $u_\alpha, u_\beta$ | voltage preset in $\alpha, \beta$ reference frame, stator-related |
| 8 | 2-to-3 Phase transformation unit |
| $u_1, u_2, u_3$ | voltage preset for three phases |
| 9 | Motor modeling module I |
| 10 | speed input interfaces |
| 11 | current input interfaces |
| 12 | voltage input interface |
| 13, 14 | first & second output interface for internally computed voltage deviation vector components |
| $K_E$ | EMF constant |
| G | Limitation element |
| $M_d, M_q$ | Multiplier elements |
| $S_d, S_q$ | Voltage summating elements |
| $VS_d, VS_q$ | Pre-summating elements |
| r | Proportional element for motor resistance |
| $sL_d, sL_q$ | direct and quadrature current differentiation element |
| $SM_d$ | sign multiplier element |
| $\Delta u_d$ | Deviation direct vector component of voltage deviation |
| $\Delta u_q$ | Deviation quadrature vector component of voltage deviation |
| 16 | EMF proportional element |
| 17 | EMF summating element |
| 18, 19 | input interfaces for direct and quadrature voltage deviation |
| 20 | Proportional element |
| 21 | first tracking summating element |
| 22 | first Integration element |
| 23 | first tracking regulator output interface |
| 24 | second Integration element |
| 25 | second tracking regulator output interface |
| A, D | Inductance proportional elements |
| B | Multiplier element |
| 26 | Inductance summating element |
| C | Proportional element |
| 27 | third output interface |
| 28 | third input interface |
| 29 | second tracking summating element |
| 30 | Model tracking regulator |
| 31 | Injection tracking regulator |
| 32 | Demodulation module |
| 33, 34 | Input interfaces |
| 35 | Bandpass Filter |
| $\omega_c$ | Carrier circuit frequency |
| 36 | Injection signal source |
| 37 | Output |
| 38 | Multiplier element |
| 39 | Switching element |
| 40 | Regulator output summating element |
| 41, 42 | current sensor |
| 43 | Sign element |
| 44 | Multiplier element |
| 45 | output interface |
| $i_{q\_dem}$ | demodulated high frequency shares of quadrature current $i_q$ |
| H | Proportional element for load error correction |
| 46 | input summating site |
| 47, 48 | input interfaces |
| PI | Proportional integral regulator |

-continued

List of reference symbols

| | |
|---|---|
| 49 | output interface |
| 50 | combination device |
| 51 | Fusion summating site |
| 52 | weighting multiplier |
| 53 | position output interface |
| 54 | Speed output of the combination device or of the fusion module |
| F | absolute value formation element |
| 55 | load error correction input |

The invention claimed is:

1. Procedure for determining the electrical drive speed ($\omega_{ef}$) or position ($\phi_e$) in a permanent magnet rotor of a brushless electrical linear or rotation machine from a measurement of a multi-phase stator current ($i_1,i_2$) especially for an electrical drive regulation circuit,
   a) whereby the speed is seamlessly determined over the entire speed range, including standstill of the rotor,
   b) while using a mathematical rotor model (9) suitable for higher speeds, whereby from the influence of a rotor back EMF that affects the stator current ($i_1,i_2$) conclusions are made about the rotor speed ($\omega_{ef}$) or position ($\phi_e$) and an appropriate model speed value (13,19,23) is generated,
   c) and while using an injection procedure (32) suitable for lower speeds up to and including standstill, whereby a current-carrying stator winding is coupled with a test signal source (36, 37) and the resulting stator currents ($i_1,i_2$) are assessed or filtered for position-sensitive anisotropies in the magnetic structure of the electrical rotor, from which conclusions can be made on the rotor speed ($\omega_{ef}$) or position ($\phi_e$) and an appropriate injection speed value (45,49) is generated,
   d) and with a fusion of the model and injection speed values (23, 49) occurring in a combination element (50, 51) that supplement each other for the estimated drive speed ($\omega_e, \omega_{ef}$),
   e) whereby corresponding with the increase in estimated drive speed ($\omega_e, \omega_{ef}$) the influence or the contributions of the injection speed values (45,49) relative to those of the model speed values (13,19,23) is weakened,
   characterized in that
   f) for weakening, the injection speed values (45,49) are weighted with coefficients (F) whose values decline with increasing speed,
   g) and the weighted injection speed values are fused with the model speed values (13,19,23) in the combination element (50,51),
   h) and the combined result from the combination element is used as the estimated drive speed ($\omega_e, \omega_{ef}$).

2. Procedure according to claim 1, characterized in that the weighting coefficients corresponding to an absolute value formation function (F) with the estimated drive speed ($\omega_{ef}$) are selected as the argument, whereby the absolute value function (F) declines, with increasing amounts of the drive speed ($\omega_{ef}$).

3. Procedure according to claim 1, characterized by a limit speed ($\omega_{e0}$), from which the weighting factors amount to zero or the contributions of the injection speed values (45,49) are suppressed.

4. Procedure according to claim 1, characterized by a limit speed ($\omega_{e0}$), from which the test signal source (36,37) is switched off.

5. Procedure according to claim 1, characterized in that the weighted injection speed values (49,52) are added with the model speed values (23) in the combination element (51).

6. Procedure according to claim 1, characterized in that the speed values ($\omega_e$) estimated at the output of the combination element (51) are subjected to a $PT_1$ or low pass filtration (E).

7. Device for estimating the drive speed ($\omega_e, \omega_{ef}$) or position ($v_e$) of a permanent magnet rotor in a brushless electrical linear or rotating machine in seamless fashion over the entire speed range, including standstill of the rotor, especially for a drive regulation circuit, suitable for carrying out an estimation procedure, with the following functional components:
   a) with a motor modeling module (9), that has:
      aa) input interfaces (10,11,12; $i_d, i_q; u_d, u_q$) for a current ($i_1, i_2$) of the stator or stator (1) of the electrical rotor or a voltage demand or for the estimated speed ($\omega_{ef}$),
      ab) and output interfaces (13,14) for voltage values ($\Delta u_d, \Delta u_q$) corresponding to a rotor back-EMF that influences the stator current ($i_1; i_2$),
   b) with a test signal or injection source (36, 37) that is coupled with the winding of the stator (1) for injecting a test signal with a preset carrier frequency ($\omega_c$),
   c) with a demodulation module (32), which is coupled on the input side with current values ($i_d, i_q$) for the stator current, has a bandpass filter (35) adjusted to the test signal carrier frequency ($\omega_c$), to which on the input side the current values ($i_d, i_q$) are forwarded, and whereby the output of the bandpass filter (35) is forwarded to an output interface (45) of the demodulation module for a demodulation current value ($i_{q\_dem}$),
   d) and with a fusion module (6) which on the input side is coupled with the output interfaces (13,14,27;45) of the motor modeling module and the demodulation module (9;32) and on the output side has an output interface (54) for the estimated drive speed ($\omega_{ef}$),
   characterized in that
   e) the fusion module (6) has a first model tracking regulator (30) coupled with the output interfaces (13, 14, 27) of the motor modeling module (9) and has a second injection tracking regulator (31) coupled with the current output interface (45) of the demodulation module (32) both of which have respective output interfaces (23; 49) at least for model and injection speed values, respectively,
   f) the tracking output interface (49) for the injection speed values is coupled with an output of an absolute value formation element (F) for weighting them, that is provided with a transfer function, that over an input signal ($\omega_{ef}$) or argument possesses a falling curve,
   g) the input of the absolute value formation element (F) is connected with an output interface of the fusion module (6) or a fusion summating block (51) for the estimated drive speed ($\omega_{ef}$),
   h) the output (49) influenced or weighted by the absolute value formation element (F) for injection speed values and the tracking regulator output interface (23) for the model speed values are jointly forwarded to a combination element or the fusion summating block (51),
   i) the output of the combination element or of the fusion summating block (51) is connected directly or indirectly with an output interface (54) of the fusion module (6) for the estimated drive speed ($\omega_{ef}$).

8. Estimation device according to claim 7, characterized in that the modeling module (9) has a speed input interface (10) that is connected with the output interface (54) of the fusion module (5) for the estimated drive speed ($\omega_{ef}$).

9. Estimation device according to claim 7, characterized by a speed-sensitive switching element (39) with a hysteresis characteristic curve, that is linked with the output interface (54) for the estimated drive speed ($\omega_{ef}$) and is embodied for response with at least one preset limit speed $\omega_{e0}$) to interrupt the coupling of the injection source (36,37) with the stator current conduits ($i_1, i_2$).

10. Estimation device according to claim 7, with a notch filter (4a) embodied for suppressing a carrier circuit frequency ($\omega_c$), characterized in that the notch filter (4a) on the input side is coupled parallel to the demodulation module (32) with the current values ($i_d, i_q$) for the stator current or the output of a coordinate transformation unit (4) for representing the stator current in a rotor-related d,q reference frame.

11. Estimation device according to claim 10, characterized in that the notch filter (4a) on the output side is connected with at least one of the current regulators of the drive regulator circuit.

12. Estimation device according to claim 10, characterized in that the notch filter (4a) is connected at least with one part of its output ($i_{d\_p}, i_{d\_q}$) to the output of a proportional element (H), embodied for load error correction, which on the output side is connected with an input (55) of the injection tracking regulator (31).

13. Fusion module (6) implemented in a circuit with input-side interfaces (18,19,28) for voltage and current values ($\Delta u_d$, $\Delta u_q$, $\Delta u_L$, $i_{q\_dem}$), with a tracking regulator device (30,31), to estimate from the voltage and current values an electrical drive position ($\phi_e$) or speed ($\omega_{ef}$) of an electrical rotor, and with output interfaces (54) for the estimated drive position ($\phi_e$) or speed ($\omega_{ef}$), characterized in that the tracking regulator device (30,31) comprises:
 a) at least two model and injection tracking regulators (30, 31) that operate independent of each other, of which one model tracking regulator (30) is assigned to the voltage values ($\Delta u_d$, $\Delta u_q$, $\Delta u_L$) and the other injection tracking regulator (31) is assigned to the current values ($i_{q\_dem}$) and both are embodied to generate speed values ($\omega_{ef}, \omega_e$) from the voltage or current values ($\Delta u_d$, $\Delta u_q$, $\Delta u_L, i_{q\_dem}$),
 b) an absolute value formation element (F) with a falling transmission function over its input signal ($\omega_{ef}$) that is increasing in terms of amount, which absolute value formation element (F) is coupled on the input side with the output interface (54) for the estimated drive speed ($\omega_{ef}$) and on the output side with the output (49) of the tracking regulator (31) assigned to the current values ($i_{q\_dem}$) for weighting of their generated speed values (49),
 c) a combination element (51), to which are jointly forwarded the injection tracking regulator output (49) coupled or weighted with the absolute value formation element (F), and the output of the model tracking regulator (30) assigned to the voltage values ($\Delta u_d, \Delta u_q, \Delta u_L$), and
 d) a connection of the output of the combination element (51) directly or indirectly with the output interface (54) of the fusion module (6) for the estimated drive speed ($\omega_{ef}$).

14. Fusion module (6) according to claim 13, characterized in that a low pass or a $PT_1$-transition element (E) is placed between the output of the combination element (51) and the output interface (54) of the fusion module (6).

15. Fusion module (6) according to claim 14, characterized in that the combination element (51) is embodied as a summating block.

16. Fusion module (6) according to claim 15, characterized in that the summating block (51) has additive inputs with a positive sign for the weighted output (52) of the injection tracking regulator (31) for the forwarded current ($i_{q\_dem}$) and the output (23) of the model tracking regulator (30) assigned to the voltage values ($\Delta u_d, \Delta u_q, \Delta u_L$).

17. Fusion module (6) according to claim 16, characterized in that the absolute value formation element (F) has one or more zero points, which correspond to one or more electrical limit speeds ($\omega_{e0}$) of the rotor.

18. Rotor modeling module (9) for a brushless electrical linear or rotating machine with a permanent magnet rotor and including:
 a) Input interfaces (11) for rotor direct and quadrature vector components ($i_d, i_q, u_d, u_q$:) of current, transformed into a rotor-related d,q reference frame, and for a voltage demand as well as for an externally estimated rotor speed ($\omega_{ef}$),
 b) and with at least two output interfaces (13,14) for direct and quadrature vector components $\Delta u_d, \Delta u_q$) of an internally computed voltage deviation, transformed into the d, q reference frame,
 c) and with multiple proportional elements (r,A,D) for weighting of the current vector components (id,iq) with an ohmic stator or rotor resistance (r) and one or more stator or rotor inductances ($L_d, L_q$),
 chararacterized by
 a limiting element (G), which at its input is linked with the input interface (10) for the externally estimated rotor speed ($\omega_{ef}$) and is linked on the output side via a multiplier element (B) with the output of a proportional element (A,D) that weights the current direct or quadrature component ($i_d, i_q$) with the direct or quadrature inductance ($L_d, L_q$).

19. Motor modeling module (9) according to claim 18, characterized by one or two limit speeds ($\omega_{e0}$), starting at which the limiter element (G) outputs a maximum or minimum value.

* * * * *